United States Patent
Jung et al.

(10) Patent No.: US 8,354,185 B2
(45) Date of Patent: Jan. 15, 2013

(54) MICROPOROUS POLYETHYLENE FILM WITH GOOD PROPERTY OF STRENGTH AND PERMEABILITY AT HIGH TEMPERATURE

(75) Inventors: Inhwa Jung, Chungcheongnam-do (KR); Jang-Weon Rhee, Daejeon (KR); Gwigwon Kang, Daejeon (KR); Youngkeun Lee, Seoul (KR); Yongkyoung Kim, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 13/403,324

(22) Filed: Feb. 23, 2012

(65) Prior Publication Data

US 2012/0156570 A1 Jun. 21, 2012

Related U.S. Application Data

(63) Continuation of application No. 12/232,112, filed on Sep. 11, 2008.

(30) Foreign Application Priority Data

Sep. 12, 2007 (KR) ........................ 10-2007-0092495

(51) Int. Cl.
*B29C 51/04* (2006.01)
*B01D 69/06* (2006.01)
*B32B 3/26* (2006.01)
*H01M 2/16* (2006.01)

(52) U.S. Cl. ....... 429/145; 429/129; 264/45.1; 521/142; 428/304.4

(58) Field of Classification Search .................. 521/142; 428/304.4; 264/45.1; 429/129
See application file for complete search history.

(56) References Cited

U.S. PATENT DOCUMENTS

| | | |
|---|---|---|
| 5,641,565 A | 6/1997 | Sogo |
| 5,759,678 A | 6/1998 | Fujii et al. |
| 6,949,315 B1 | 9/2005 | Samii et al. |
| 2005/0277702 A1* | 12/2005 | Lee et al. ...................... 521/142 |
| 2006/0008636 A1 | 1/2006 | Lee et al. |
| 2006/0009538 A1 | 1/2006 | Lee et al. |
| 2006/0103055 A1 | 5/2006 | Hoshuyama et al. |
| 2009/0079102 A1 | 3/2009 | Takita et al. |
| 2009/0148685 A1 | 6/2009 | Kang et al. |
| 2009/0269656 A1 | 10/2009 | Takita et al. |

FOREIGN PATENT DOCUMENTS

| | | |
|---|---|---|
| JP | 10-137043 | 5/1998 |
| JP | 11-322989 | 11/1999 |
| JP | 2001-144910 | 5/2001 |
| JP | 2003-119306 | 4/2003 |
| JP | 2007106992 A | 4/2007 |
| WO | 9948959 A1 | 9/1999 |
| WO | 2004024808 A1 | 3/2004 |
| WO | 2006-123850 | 11/2006 |
| WO | 2006123850 A1 | 11/2006 |
| WO | 2006137535 A1 | 12/2006 |

* cited by examiner

*Primary Examiner* — Randy Gulakowski
*Assistant Examiner* — Kara Boyle
(74) *Attorney, Agent, or Firm* — The Webb Law Firm

(57) ABSTRACT

The present invention relates to a microporous polyethylene film for use as battery separator. The microporous polyethylene film according to the present invention is characterized by having a film thickness of 5-40 μm, a porosity of 35-55%, a permeability from $2.5 \times 10^{-5}$ to $10.0 \ 10^{-5}$ Darcy, a puncture strength of at least 0.10 N/μm at 90° C., a puncture angle of at least 30° at 90° C., and a permeability from $2.0 \ 10^{-5}$ to $8.0 \ 10^{-5}$ Darcy after shrinking freely at 120° C. for 1 hour. The microporous polyethylene film in accordance with the present invention has very superior puncture strength and thermal stability at high temperature and takes place of less decrease of permeability due to low thermal shrinkage at high temperature, as well as superior permeability. Therefore, it can be usefully applied in a high-capacity, high-power battery to improve thermal stability and long-term stability of the battery.

9 Claims, 1 Drawing Sheet

MICROPOROUS POLYETHYLENE FILM WITH GOOD PROPERTY OF STRENGTH AND PERMEABILITY AT HIGH TEMPERATURE

CROSS-REFERENCE TO RELATED APPLICATIONS

This application is a continuation of U.S. patent application Ser. No. 12/232,112 filed Sep. 11, 2008, which claims priority under 35 U.S.C. §119 to Korean Patent Application No. 10-2007-0092495, filed on Sep. 12, 2007, in the Korean Intellectual Property Office, the entire contents of each of which are incorporated herein by reference.

BACKGROUND

1. Field of the Invention

The present invention relates to a microporous polyethylene film with good strength and stability at high temperature while having good permeability, more particularly to a microporous polyethylene film for a lithium secondary battery separator with high capacity and output.

2. Background of the Related Art

Microporous polyethylene films have been widely used for battery separators, separation filters and membranes for microfiltration, due to their chemical stability and excellent physical properties. In particular, separators for secondary battery require the highest grade quality along with the requirement for battery safety. Recently, with the improvement of capacity and output of secondary batteries, requirement of thermal stability of separators is becoming more rigorous. Especially, poor thermal stability of a separator for a lithium secondary battery may result in damage or deformation of the separator due to overheating of the battery, which may lead to short circuit of electrodes and fire.

Thermal stability of a battery is largely dependent on the strength of separator at high temperature.

Good separator strength at high temperature is needed to prevent damage of the separator at high temperature caused by the dendrites formed on the electrode during charge and discharge of a battery, and thereby to prevent short circuit between electrodes. Short circuit between electrodes results in overheating of the battery and, in severe cases, may lead to firing or explosion.

In addition to the thermal stability, long-term stability is also required for a battery. It is impossible to avoid heating during using battery. As a result, the separator experiences thermal deformation over a long period of time and loses its initial characteristics. In particular, permeability of the separator decreases due to thermal shrinkage and the migration of low molecular weight polyethylene included in the separator toward the surface at high temperature. As a result, the lifetime and capacity of the battery become poor. Therefore, thermal stability of a separator is very important in maintaining battery performance.

In order to improve thermal stability of a separator, U.S. Pat. No. 6,949,315 discloses a method of compounding ultrahigh molecular weight polyethylene with 5-15 wt % inorganic material, e.g., titanium oxide. However, this method is associated with the following problems. The use of the ultrahigh molecular weight polyethylene results in increased extrusion load, reduced extrusion compoundability, and decreased productivity due to insufficient stretching. Further, the addition of an inorganic material may lead to insufficient compounding and uneven quality and generating pinhole occurring therefrom. Besides, insufficient compatibility at the interface of the inorganic material and the polymer resin leads to poor film properties.

U.S. Pat. No. 5,641,565 discloses a method of improving thermal stability of a separator by using a highly heat-resistant resin. However, this technique requires the use of a ultrahigh molecular weight polymer having a molecular weight more than 1,000,000 in order to prevent deterioration of physical properties caused by the use of polyethylene with polypropylene and the addition of an inorganic material. Further, the process for removing the inorganic material by extracting makes the entire process complicated.

Japanese Patent Publication No. 1999-322989 aims at improving thermal stability of a separator by reducing shrinkage in a transverse direction. In this patent, stretching is carried out in the machine direction only or total stretch ratio is decreased to reduce thermal shrinkage in the transverse direction. As a result, low stretching ratio makes the improvement of physical properties poor the. The products described in the examples have a very low puncture strength of about 0.06-0.11 N/μm at room temperature. Although properties at high temperature are not presented, improvement of thermal stability at high temperature may be poor considering that puncture strength tends to decrease as temperature increases.

Although Japanese Patent Publication No. 2003-119306 discloses a separator having a shrinkage ratio less than 1%, separator strength was not measured at all and, in particular, strength at high temperature is not considered at all. Therefore, maximizing battery safety at high temperature may be difficult to be expected.

Further, all of the above-mentioned techniques, besides their weaknesses described above, do not consider the change of permeability after shrinking at high temperature at all. Therefore, it will be difficult to attain superior long-term lifetime and capacity of a battery.

The above information disclosed in this Background section is only for enhancement of understanding of the background of the invention and therefore it may contain information that does not form the prior art that is already known in this country to a person of ordinary skill in the art.

SUMMARY OF THE INVENTION

Technical Problems

The inventors of the present invention have carried out extensive researches in order to solve the problems of the conventional technique as described above, and found out that the microporous polyethylene films having the following characteristics are superior as a separator for lithium secondary battery.

(1) A microporous polyethylene film having a film thickness of 5-40 μm, a porosity of 35-55%, a permeability from $2.5 \times 10^{-5}$ to $10.0 \ 10^{-5}$ Darcy, a puncture strength of at least 0.10 N/μm at 90° C., a puncture angle of at least 30° at 90° C., and a permeability from $2.0 \ 10^{-5}$ to $8.0 \ 10^{-5}$ Darcy after shrinking freely at 120° C. for 1 hour.

(2) The microporous polyethylene film as set forth in (1), wherein polyethylene has a weight average molecular weight from $2.0 \times 10^5$ to $4.5 \ 10^5$.

(3) The microporous polyethylene film as set forth in (1), which has a film thickness of 9-25 μm, a porosity of 35-50%, a permeability from $3.0 \times 10^{-5}$ to $8.0 \ 10^{-5}$ Darcy, a puncture strength of at least 0.12 N/μm at 90° C., a puncture angle of at least 32° at 90° C., and a permeability from $2.5 \times 10^{-5}$ to $7.0 \ 10^{-5}$ Darcy after shrinking freely at 120° C. for 1 hour.

Accordingly, an object of the present invention is to provide a microporous polyethylene film capable of improving thermal stability and long-term stability of a high-capacity, high-power lithium secondary battery.

Technical Solution

To attain the above mentioned objects, the present invention provides, in an aspect, a microporous polyethylene film which is made from a resin composition comprising 20-50 wt % polyethylene and 80-50 wt % diluent and which has a film thickness of 5-40 μm, a porosity of 35-55%, a permeability from $2.5 \times 10^{-5}$ to $10.0 \; 10^{-5}$ Darcy, a puncture strength of at least 0.10 N/μm at 90° C., a puncture angle of at least 30° at 90° C., and a permeability from $2.0 \; 10^{-5}$ to $8.0 \; 10^{-5}$ Darcy after shrinking freely at 120° C. for 1 hour.

BRIEF DESCRIPTION OF THE DRAWINGS

The above and other objects, features and other advantages of the present invention will be more clearly understood from the following detailed description taken in conjunction with the accompanying drawings, in which.

Figure 1:
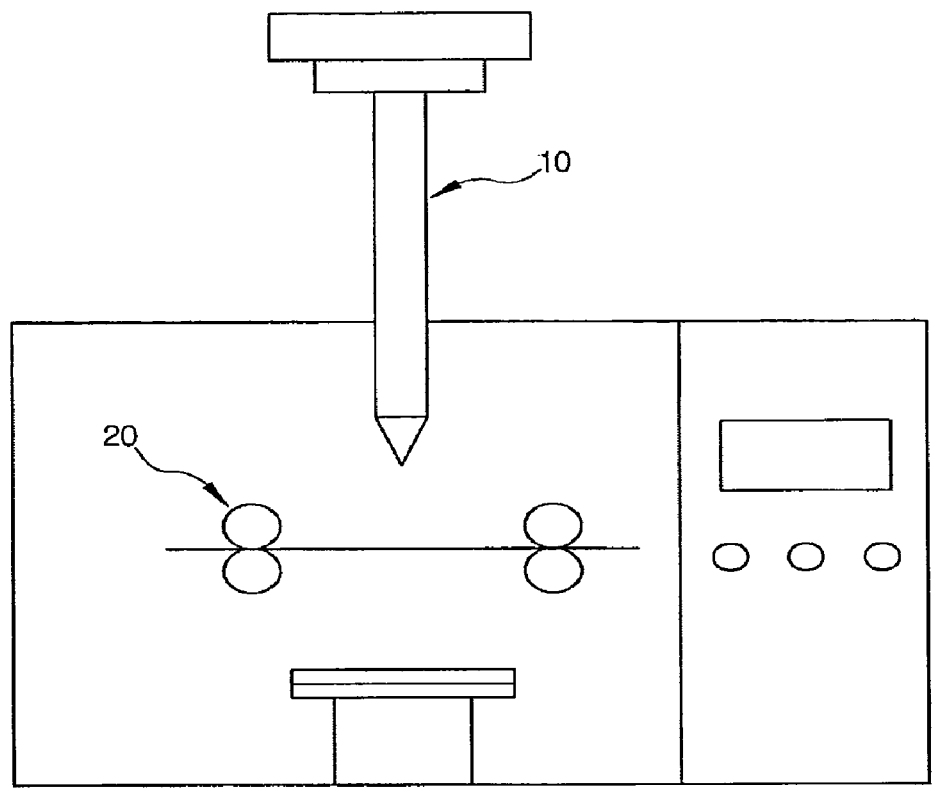
FIG. 1 schematically illustrates an apparatus for measuring puncture strength at high temperature. A convection oven is used to maintain the temperature of a measuring cell constantly. The pin tip for measuring has a diameter of 1.0 mm and a radius of curvature of 0.5 mm.

| Detailed Description of Main Elements | |
|---|---|
| 10: pin tip | 20: rubber rings |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations and shapes will be determined in part by the particular intended application and use environment.

DETAILED DESCRIPTION OF THE PREFERRED EMBODIMENTS

Hereinafter, reference will be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also other various alternatives, modifications, equivalents and other embodiments, which may be included within the spirit and scope of the invention as defined in the appended claims.

Preferred embodiments of the present invention are as follows.

(1) The film thickness is 5-40 μm.

The film thickness of the microporous polyethylene film according to the present invention is from 5 to 40 μm, but, to make separator stronger and make battery light, the film thickness preferably may be from 9 to 25 μm. If the thickness is less than 5 μm, battery stability may not be ensured at high temperature because of weak separator strength. And, if the film thickness exceeds 40 μm, the separator may not be adequate for a high-capacity, high-power battery because of insufficient permeability.

(2) The porosity is 35-55%.

The porosity is from 35 to 55%, but, when considering separator strength, the porosity preferably may be from 35 to 50%. If the porosity is smaller than 35%, permeability may be insufficient and the capability of absorbing electrolyte decreases. If the porosity exceeds 55%, separator strength may be insufficient.

(3) The air permeability (Darcy's permeability constant) is from $2.5 \times 10^{-5}$ to $10.0 \; 10^{-5}$ Darcy.

A larger air permeability is preferred. If the air permeability is $2.5 \times 10^{-5}$ Darcy or greater, the efficiency of the film as a porous film is increased greatly, and the ion permeability as well as the charge/discharge characteristics of the battery are improved. The film of the present invention having a air permeability of at least $2.5 \times 10^{-5}$ Darcy provides a battery with superior charge/discharge characteristics, discharge rate, superior low-temperature characteristics and long lifetime. More preferably, the permeability is from $3.0 \times 10^{-5}$ to $8.0 \; 10^{-5}$ Darcy. If the permeability is less than $2.5 \times 10^{-5}$ Darcy, battery capacity, charge/discharge characteristics, low-temperature characteristics and lifetime characteristics are degraded. If the permeability exceeds $10.0 \times 10^{-5}$ Darcy, short circuit or other safety problem may occur because the permeability is too high.

(4) At 90° C., the puncture strength is at least 0.10 N/μm and the puncture angle is at least 30°.

Puncture strength means film strength against sharp objects. When the microporous film is used for a battery separator, an insufficient puncture strength may result in the penetration of the film by an uneven surface state of the electrode and by the dendrites formed on the electrode surface. As a result, a short circuit may occur. When the temperature inside a battery is increased due to overcharging or other problems, short circuit may occur because of the dendrites formed on the electrode surface. Therefore, puncture strength at high temperature is one of important characteristics. Puncture angle refers to the angle at which the film is punctured during measuring puncture strength. As well as puncture strength, a larger puncture angle is preferred. It is also an important factor in preventing short circuit.

Through repeated experiments, it was confirmed that superior thermal stability is attained when the puncture strength is at least 0.10 N/μm and the puncture angle is at least 30°, at high temperature (90° C.). More preferably, the puncture strength is from 0.12 N/μm to 0.5 N/μm and the puncture angle is from 32° to 85°, at 90° C. If the puncture strength is less than 0.10 N/μm at 90° C., thermal stability of a battery is degraded. And, if the puncture angle is smaller than 30° at 90° C., short circuit may occur because the separator may easily be punctured by dendrites.

(5) The permeability after shrinking freely at 120° C. for 1 hour is from $2.0 \; 10^{-5}$ to $8.0 \; 10^{-5}$ Darcy.

A high-capacity, high-power battery requiring good thermal stability should have low shrinking ratio and high permeability at high temperature. The microporous film according to the present invention is associated with less decrease of permeability at high temperature, and has superior charge/discharge characteristics, lifetime and thermal stability at high temperature. Generally, when a high-capacity, high-power battery is used, temperature inside the battery increases due to electrochemical exothermic reactions. A separator with poor thermal stability will shrink too much, thereby resulting in significantly decreased permeability and battery capacity. Through repeated experiments, it was confirmed that a separator having a permeability after shrinking freely at 120° C. for 1 hour from $2.0 \times 10^{-5}$ to $8.0 \times 10^{-5}$ Darcy has superior thermal stability and does not decrease battery capacity. More preferably, the permeability after shrinking freely at 120° C. for 1 hour is from $2.5 \times 10^{-5}$ to $7.0 \times 10^{-5}$ Darcy. If the permeability after shrinking freely at 120° C. for 1 hour is less than $2.0 \times 10^{-5}$ Darcy, the high-capacity, high-power battery requirement is not satisfied because of insufficient permeability. And, if the permeability exceeds $8.0 \times 10^{-5}$ Darcy, short circuit or other safety problem may occur because of too high permeability.

The present invention aims at providing a microporous polyethylene film capable of improving thermal stability and long-term stability and a separator satisfying the high-capacity, high-power battery requirement.

A preferred preparation method for preparing the microporous polyethylene film of the present invention may comprise:

(a) melting, compounding and extruding a mixture comprising 20-50 wt % polyethylene and 80-50 wt % diluent, which occurs liquid-liquid phase separation from polyethylene at 160-280° C., above the temperature of liquid-liquid phase separation in an extruder to form a thermodynamic single phase;

(b) carrying out phase separation of the resultant of molten material in a single phase and forming it into a sheet;

(c) stretching the sheet by sequential or simultaneous biaxial stretching at a stretching ratio of at least 5.0 times in transverse and machine directions, respectively;

(d) extracting the diluent from the stretched film, and then shrinking the film by 15-30% while drying; and (e) heat-setting the dried film to remove residual stress from the stretched film at a heat-setting tenter temperature at which 30-50% of the film is melted, such that the film that has been stretched to at least 1.2 times is finally shrunken to 1.1 times or less, based on the film width provided to the heat-setting tenter.

Hereinafter, each step will be described in more detail.

When polyethylene and a diluent, which occurs liquid-liquid phase separation from polyethylene but may form a single phase at high temperature, are compounded at high temperature into a single phase, and then slowly cooled, phase separation occurs before polyethylene is crystallized into solid. This phase separation is called as liquid-liquid phase separation, as the phase separation occurs between the polyethylene and the diluent which are both in liquid state, The respective phases separated by this phase separation are a polyethylene rich phase mostly consisting of polyethylene and a diluent rich phase consisting of a small amount of polyethylene dissolved in the diluent. The two thermodynamically separated phases undergoes coarsening, or aggregation of the same phase, with time, when both phases are subject to a condition (or temperature) under which they have mobility. As a result, the size of the separated phases becomes larger. The size and composition of the separated phases formed by the coarsening action depends on the residence time in the liquid-liquid phase separation state and the temperature at which the liquid-liquid phase separation state is maintained. After carrying out the phase separation to a desired size and composition, the molten material is completely cooled to obtain a solidified polyethylene rich phase. Then, by extracting out the diluent rich phase using an organic solvent, a microporous polyethylene film is obtained.

The basic physical properties of a microporous film are determined by the polyethylene concentration in the polyethylene rich phase during the phase separation. If the polyethylene concentration of the polyethylene rich phase is increased sufficiently as the phase separation completed sufficiently, the mobility of polyethylene chains decreases and the effect of forced orientation is increased during stretching after cooling. As a result, mechanical strength is improved. That is, given the same resin with the same molecular weight, a composition obtained by sufficient phase separation has much superior mechanical strength than one obtained by insufficient phase separation.

Also, the basic pore structure, i.e., pore size and structure, of the microporous film is determined by the size and structure of the diluent rich phase during the phase separation process. Accordingly, Pore structure can be controlled by selecting condition with different thermodynamic phase separation temperature or adjusting rate, temperature, etc. of phase separation.

Preferably, the polyethylene used in the present invention has a weight average molecular weight from $2.0 \times 10^5$ to $4.5 \times 10^5$. If the weight-average molecular weight is smaller than $2 \times 10^5$, a microporous film with superior physical properties cannot be obtained. Also, If the weight average molecular weight is larger than $4.5 \times 10^5$, load to the extruder increases during extrusion because of increased viscosity, compounding with the diluent becomes difficult because of large viscosity difference between the polyethylene and the diluent, and the surface of the extruded sheet becomes rough. These problems may be solved by increasing extrusion temperature or adjusting the screw configuration of a twin screw extruder to increase shear rate. In that case, however, physical properties become poor due to deterioration of the resin.

The diluent used in the present invention may be any organic liquid compound which is liquid-liquid phase separable at 160-280° C. when it is mixed with 20-50 wt % polyethylene to form a 100 wt % composition. Examples include a phthalic acid ester such as dibutyl phthalate, dihexyl phthalate, dioctyl phthalate, and the like; an aromatic ether such as diphenyl ether, benzyl ether, and the like; a $C_{10}$-$C_{20}$ fatty acid such as palmitic acid, stearic acid, oleic acid, linoleic acid, linolenic acid, and the like; a $C_{10}$-$C_{20}$ fatty alcohol such as palmityl alcohol, stearyl alcohol, oleyl alcohol, and the like; and a fatty acid ester derived from esterification of one or more saturated or unsaturated fatty acid having from 4 to 26 carbon atoms in the fatty acid group and an alcohol having from 1 to 8 hydroxy group(s) and from 1 to 10 carbon atom(s), such as palmitic acid mono-, di- or triester, stearic acid mono-, di- or triester, oleic acid mono-, di- or triester, linoleic acid mono-, di- or triester, and the like. As long as liquid-liquid phase separation from polyethylene at 160-280° C. is possible, the above-mentioned substances may be used in mixtures. Particularly, it is possible to mix above diluent with at least one substance selected from paraffin oil, mineral oil and wax.

If the temperature of liquid-liquid phase separation is below 160° C., the temperature of the exit part of the extruder should be lowered sufficiently below 160° C. for sufficient progression of liquid-liquid phase separation. However, in this case, polyethylene is not melted sufficiently because extrusion is carried out at a temperature close to the melting point of polyethylene. As a result, viscosity increases greatly, thereby resulting in excessive mechanical load to the extruder. Further, a normal extrusion processing is not feasible because the sheet surface becomes rough. On the contrary, if the temperature of liquid-liquid phase separation is increased above 280° C., compounding should be carried out at a temperature higher than 280° C. in order to form a thermodynamic single phase at the stage of extrusion. However, at such a high temperature, oxidative decomposition of the mixture occurs rapidly. As a result, it is not possible to produce products having desired physical properties.

Preferably, the contents of polyethylene and diluent used in the present invention are 20-50 wt % and 80-50 wt %, respectively. If the content of diluent is less than 50 wt %, permeability is reduced greatly because of decreased porosity, reduced pore size, and insufficient interconnection among pores. On the other hand, if the content of the diluent exceeds 80 wt %, there may occur such problems as breakage, uneven thickness, and the like during stretching, because polyethylene and the diluent are extruded to gel state without being thermodynamically compounded.

The methods for forming the molten material into a sheet may be general casting or calendaring methods. The molten material extruded at 160-280° C. is cooled to room temperature to form a sheet having predetermined thickness and width.

The liquid-liquid phase separated sheet is stretched by simultaneous biaxial stretching or sequential biaxial stretching with at least 5.0 times of a stretching ratio in the transverse and machine directions, respectively, and a total stretching ratio of 25-50 times. If the stretching ratio in one direction is less than 5.0 times, orientation along the direction is not sufficient, and the physical balance in the machine and transverse directions is broken. As a result, tensile strength, puncture strength, etc. are reduced, and short circuit may occur at 90° C. due to dendrites. By enhancing orientation in the transverse and machine directions, it is possible to improve mechanical strength and permeability, and, thereby, to compensate for the physical properties sacrificed at the next step of the process to provide thermal stability. If the total stretching ratio is less than 25 times, stretching becomes insufficient. On the other hand, if the total stretching ratio exceeds 50 times, breakage of film may occur during stretching, and shrinkage of the film may be increased undesirably.

In tenter-type simultaneous biaxial stretching, stretching temperature may be controlled differently in the following three zones; a preheating zone, a stretching zone and a heat-setting zone. The temperature of the preheating zone and the stretching zone is set at about 2-10° C. lower than the melting temperature of the molded sheet comprising polyethylene and the diluent, in order to obtain a separator with high permeability. When the temperature of the heat-setting zone is set about 1-15° C. higher than that of the stretching zone and at least 1° C. lower than the melting temperature of polyethylene, reduction of permeability after shrinking freely at 120° C. for 1 hour is little, and, thus, permeability is maintained at $2.0 \times 10^{-5}$ Darcy or above and superior thermal stability, high capacity and high power are attained. The melting temperature of polyethylene and molded sheet can be measured by differential scanning calorimetry (DSC) analysis. If the temperature of the stretching zone is higher than the melting temperature of the molded sheet minus 2 degrees, strength of the film inside the stretching machine becomes too weak, thereby resulting in uneven stretching and insufficient film strength. On the contrary, if the temperature of the stretching zone is below the melting temperature of the molded sheet minus 10 degrees, breakage of film may occur during stretching because the molded sheet lacks in softness, insufficient stretching may occur, or permeability may decrease. If the temperature of the heat-setting zone is maintained 1-15° C. higher than the stretching temperature, thermal stability is enhanced as the polyethylene molecules that have been oriented during stretching are relaxed. At the same time, the temperature of the heat-setting zone should be lower than the melting temperature of polyethylene minus 1 degree. If the temperature of the heat-setting zone is higher than the melting temperature of polyethylene minus 1 degree, the film may become uneven due to partial melting because the temperature is too close to the melting temperature of polyethylene. And, if the temperature of the heat-setting zone is lower than the temperature of the stretching zone plus 1 degree, the effect of improving thermal stability decreases due to insufficient relaxation of polyethylene.

From the film stretched by at least 5.0 times in the transverse and machine directions, respectively, the diluent is extracted using an organic solvent, and then, the organic solvent is dried out. In this process, film shrinkage occurs. As film shrinkage occurs during the drying of the organic solvent, pore size decreases and permeability is reduced. Accordingly, permeability and shrinking ratio of separator can be controlled through the control of film shrinkage during the drying process. Through repeated experiments, it was confirmed that, if the film is shrunk by 15-30% during the process of extracting the diluent and drying, reduction of permeability after shrinking freely at 120° C. for 1 hour is little, and permeability is maintained at $2.0 \times 10^{-5}$ Darcy or above, and that a microporous film with superior permeability and thermal stability (a microporous film with low shrinking ratio at high temperature) can be obtained.

Film shrinkage can be controlled by adjusting the tension applied to the film during the drying process. Large tension during the drying process results in less shrinkage, and small tension results in more shrinkage. The tension applied to the film during the drying process varies depending on the film thickness. The degree of shrinkage is measured by the change of film area considering the shrinkage in the machine and transverse directions. In one word, it is calculated as the ratio of the film area prior to extraction to the area after drying. If the shrinkage during drying is less than 15%, the shrinking ratio of the microporous film becomes high, thereby resulting in further decrease of permeability after shrinking freely at 120° C. for 1 hour, and formation of microcracks on the film surface. Also, if the shrinkage exceeds 30%, it is difficult to prepare microporous film with high permeability.

The organic solvent that can be used in the present invention is not particularly restricted, but any solvent capable of extracting the diluent used to extrude the resin may be used. Preferably, methyl ethyl ketone, methylene chloride, hexane, and the like may be used because they are efficient for extracting diluents and are dried promptly. As to the extraction method, any conventional solvent extraction process may be used alone or in combination, including immersion, solvent spraying, ultrasonication, or the like. Upon extraction, the content of residual diluent should be not more than 1 wt %. If the content of residual diluent exceeds 1 wt %, physical properties of the film are deteriorated and permeability of the film decreases. The content of residual diluent is greatly dependent upon extraction temperature and extraction time. A higher extraction temperature will be desired in view of solubility of the diluent in the solvent. However, when considering safety associated with boiling of the solvent, an extraction temperature not higher than 40° C. is preferred. The extraction temperature should be higher than the solidifying point of the diluent because the extraction efficiency decreases significantly at a temperature lower than the solidifying point.

The dried film is subjected to heat-setting in order to improve thermal stability by removing residual stress. In the heat-setting tenter, the temperature of the heat-setting and the stretching and shrinking ratio may be controlled. The temperature of the heat-setting is also controlled differently in the following three zones; a preheating zone, a stretching zone and a shrinking zone. For thermal stability, heat-setting is carried out at a temperature where 30-50 wt % of the film is melted. As a result, the shrinking ratio of the microporous film is reduced and the decrease of permeability after shrinking freely at 120° C. for 1 hour is reduced. Consequently, high-capacity, battery performance can be maintained. If the heat-setting is performed at a temperature lower than the temperature at which less than 30 wt % of the film is melted, the effect of removing residual stress decreases because of insufficient reorientation of polyethylene molecules in the film, and thermal stability decreases because of high shrinking ratio of microporous film at high temperature. On the other hand, if the heat-setting is performed at a temperature higher than the temperature at which more than 50 wt % of the film is melted, the film becomes uneven due to partial melting, and it is difficult to prepare a film with high permeability. Also, in order to maximize thermal stability, it is preferable to stretch the film at least 1.2 times the width as that of the film introduced to the heat-setting tenter in the stretching zone, and then shrink the film to 1.1 times or less in the shrinking zone. More preferably, the film is shrunk to 1.1-1.0 times in the shrinking zone. The width ratio is based on the width at the inlet of heat-setting tenter. That is, in the stretching zone, the film is stretched at least 1.2 times based on the width at the inlet, and in the shrinking zone, the width is reduced to 1.1 times or less.

If the stretching in the stretching zone is less than 1.2 times or the shrinking in the shrinking zone exceeds 1.1 times, shrinkage is not sufficiently performed in the shrinking zone. As a result, relaxation of oriented polyethylene is insufficient, and shrinking ratio of microporous film is increased, and decrease of permeability after shrinking freely at 120° C. for 1 hour increases. Consequently, performance of a high-capacity, high-power battery may be deteriorated, and thermal stability may become poor as the shrinking ratio of the microporous film increases.

Advantageous Effects

The microporous polyethylene film according to the present invention has very superior strength and stability at high temperature and takes place of less decrease of permeability due to low thermal shrinkage at high temperature, as well as superior permeability. Therefore, it can be usefully applied in a high-capacity, high-power battery.

BEST MODE FOR INVENTION

The following examples illustrate the present invention in more details, but they are not intended to limit the scope of the present invention.

EXAMPLES

Various characteristics of microporous polyethylene film of the present invention were evaluated as follows.
(1) Porosity (%)
A sample was cut to a rectangular shape (A cm×6 cm), and porosity was calculated from the following Equation 1. Both A and B were in the range from 5 to 20 cm.

$$\text{Porosity} = \{[(ABT) - (M \div \rho)] \div (ABT)\} \times 100 \quad \text{Equation 1}$$

where
T=film thickness (cm),
M=sample weight (g), and
$\rho$=density of resin (g/cm$^3$).

(2) Permeability (Darcy)
Air permeability was measured using a porometer (CFP-1500-AEL, PMI). Air permeability is usually expressed in terms of Gurley number. But, with the Gurley number, it is difficult to measure the relative permeability with respect to the pore structure of the film itself, because the effect of the film thickness is not corrected. To avoid this problem, Darcy's permeability constant was used instead of Gurley number. Darcy's permeability constant is obtained by the following Equation 2. Nitrogen was used in the present invention.

$$C = (8FTV) / \{\pi D^2 (P^2 - 1)\} \quad \text{Equation 2}$$

where
C=Darcy's permeability constant,
F=flow rate,
T=sample thickness,
V=viscosity of gas (0.185 for $N_2$),
D=sample diameter, and
P=pressure.

In the present invention, average value of Darcy's permeability constant in the pressure range from 100 to 200 psi was used.

(3) Permeability after Shrinking Freely at 120° C. for 1 Hour (Darcy)
The film was placed between two sheets of general-use A4 paper. After keeping in a convection oven (FO-450M, Jeio Tech) at 120° C. for 1 hour and sufficiently cooling at room temperature for 10 minutes, permeability was measured as in (2).

(4) Puncture Strength (N/µm)
A pin tip with a diameter of 1.0 mm and a radius of curvature of 0.5 mm was installed at INSTRON's UTM (universal test machine) 3345 (Instron). Crosshead speed is 120 mm/min. The film was installed at a holder above and below which are attached rubber rings with an outer diameter of 20 mm and an inner diameter of 16 mm. Puncture strength was calculated by the following Equation 3. Puncture strength at 90° C. was measured after placing the holder to which the film was installed in a convection oven, as shown in FIG. 1, and stabilizing for at least 3 minutes.

$$\text{Puncture strength (N/µm)} = \text{Measured load (N)} \div \text{Film thickness (µm)} \quad \text{Equation 3}$$

Figure 2:
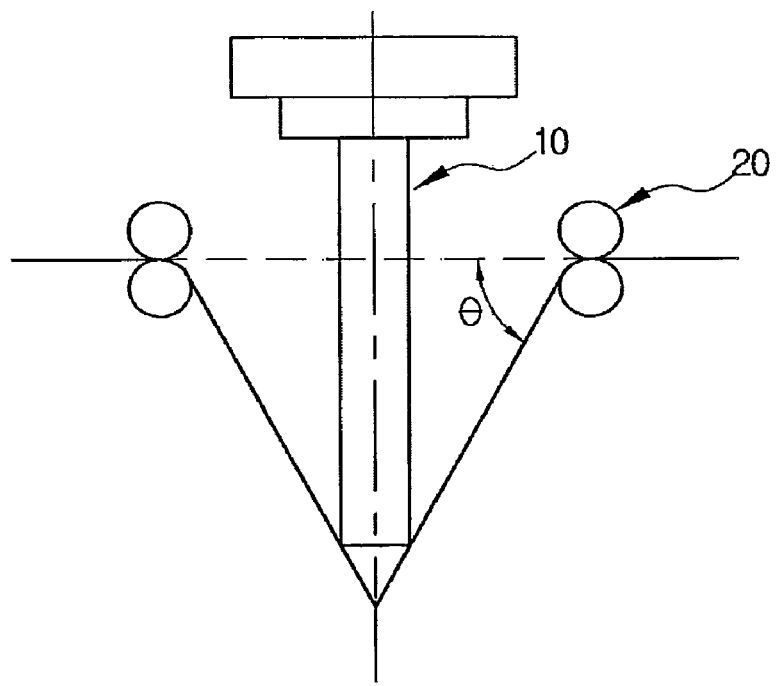
FIG. 2 schematically illustrates an example of measuring puncture strength and puncture angle. Rubber rings above and below the measuring cell are holding the film tightly.

(5) Puncture Angle (Degree)
Puncture angle refers to the angle at which the film is punctured during the puncture strength measurement, as shown in FIG. 2. The puncture angle was calculated by the following Equation 4.

$$\text{Puncture angle (degree)} = \tan^{-1}[L \text{ (mm)} \div R \text{ (mm)}] \quad \text{Equation 4}$$

where
L=distance the film was pushed down until it was punctured, and
R=radius of the film based on the inner diameter of the rubber ring.

Example 1

High density polyethylene having a weight average molecular weight of 3.0×10$^5$ and a melting temperature of 135° C. (Resin 1) was used, and dibutyl phthalate was used as diluent. The contents of polyethylene and the diluent were 25 wt % and 75 wt %, respectively.

Phase separation was carried out by setting the temperature of the first 12 sections of the total of 20 sections of the extruder at 250° C., the temperature of the 13th and 14th sections at 220° C., and the temperature of the 15th through 20th sections at 185° C., which was lower than the temperature of liquid-liquid phase separation. A simultaneous biaxial stretching machine was used and stretching condition, stretching ratio, and heat-setting width ratio and temperature are given in the following Table 1.

Example 2

High density polyethylene having a weight average molecular weight of $3.8 \times 10^5$ and a melting temperature of 136° C. (Resin 2) was used, and a 1:2 mixture of dibutyl phthalate and paraffin oil having a kinetic viscosity of 160 cSt at 40° C. was used as diluent. The contents of polyethylene and the diluent were 30 wt % and 70 wt %, respectively.

Phase separation was carried out sufficiently by setting the temperature of the first half of the extruder at 210° C., and the temperature of the latter half at 180° C. and 150° C. A simultaneous biaxial stretching machine was used and stretching condition, stretching ratio, and heat-setting width ratio and temperature are given in Table 1.

Example 3

High density polyethylene having a weight average molecular weight of $3.8 \times 10^5$ and a melting temperature of 136° C. (Resin 2) was used, and a 1:2 mixture of oleic acid triglyceride and linoleic acid triglyceride was used as diluent. The contents of polyethylene and the diluent were 35 wt % and 65 wt %, respectively.

Phase separation was carried out sufficiently by setting the temperature of the first half of the extruder at 230° C., and the temperature of the latter half at 200° C. and 170° C. A simultaneous biaxial stretching machine was used and stretching condition, stretching ratio, and heat-setting width ratio and temperature are given in Table 1.

Example 4

High density polyethylene having a weight average molecular weight of $3.0 \times 10^5$ and a melting temperature of 135° C. (Resin 1) was used, and a 1:2 mixture of dibutyl phthalate and paraffin oil having a kinetic viscosity of 160 cSt at 40° C. was used as diluent. The contents of polyethylene and the diluent were 40 wt % and 60 wt %, respectively.

Phase separation was carried out sufficiently by setting the temperature of the first half of the extruder at 210° C., and the temperature of the latter half at 180° C. and 150° C. A simultaneous biaxial stretching machine was used and stretching condition, stretching ratio, and heat-setting width ratio and temperature are given in Table 1.

Example 5

High density polyethylene having a weight average molecular weight of $3.8 \times 10^5$ and a melting temperature of 136° C. (Resin 2) was used, and a 1:2 mixture of dibutyl phthalate and paraffin oil having a kinetic viscosity of 160 cSt at 40° C. was used as diluent. The contents of polyethylene and the diluent were 30 wt % and 70 wt %, respectively.

Phase separation was carried out in the same manner as Example 4. A simultaneous biaxial stretching machine was used and stretching condition, stretching ratio, and heat-setting width ratio and temperature are given in Table 1.

Comparative Example 1

High density polyethylene having a weight average molecular weight of $3.0 \times 10^5$ and a melting temperature of 135° C. (Resin 1) was used, and dibutyl phthalate was used as diluent. The contents of polyethylene and the diluent were 55 wt % and 45 wt %, respectively.

Phase separation was carried out by setting the temperature of the first 12 sections of the total of 20 sections of the extruder at 230° C., the temperature of the 13th and 14th sections at 200° C., and the temperature of the 15th through 20th sections at 170° C., which was lower than the temperature of liquid-liquid phase separation. A simultaneous biaxial stretching machine was used and stretching condition, stretching ratio, and heat-setting width ratio and temperature are given in the following Table 2.

Comparative Example 2

High density polyethylene having a weight average molecular weight of $3.8 \times 10^5$ and a melting temperature of 136° C. (Resin 2) was used, and a 1:2 mixture of dibutyl phthalate and paraffin oil having a kinetic viscosity of 120 cSt at 40° C. was used as diluent. The contents of polyethylene and the diluent were 30 wt % and 70 wt %, respectively.

Phase separation was carried out sufficiently by setting the temperature of the first half of the extruder at 210° C., and the temperature of the latter half at 180° C. and 150° C. A simultaneous biaxial stretching machine was used and stretching condition, stretching ratio, and heat-setting width ratio and temperature are given in Table 2.

Comparative Example 3

High density polyethylene having a weight average molecular weight of $3.8 \times 10^5$ and a melting temperature of 136° C. (Resin 2) was used, and dioctyl phthalate was used as diluent. The contents of polyethylene and the diluent were 40 wt % and 60 wt %, respectively.

Phase separation was carried out sufficiently by setting the temperature of the first half of the extruder at 230° C., and the temperature of the latter half at 200° C. and 170° C. A simultaneous biaxial stretching machine was used and stretching condition, stretching ratio, and heat-setting width ratio and temperature are given in Table 2.

Comparative Example 4

High density polyethylene having a weight average molecular weight of $1.8 \times 10^5$ and a melting temperature of 133° C. (Resin 3) was used, and paraffin oil having a kinetic viscosity of 120 cSt at 40° C. was used as diluent. The contents of polyethylene and the diluent were 35 wt % and 65 wt %, respectively.

Phase separation was carried out sufficiently by setting the temperature of the first half of the extruder at 180° C., and the temperature of the latter half at 180° C. and 180° C. A sequential biaxial stretching machine was used and stretching condition, stretching ratio, and heat-setting width ratio and temperature are given in Table 2.

Comparative Example 5

High density polyethylene having a weight average molecular weight of $3.8 \times 10^5$ and a melting temperature of 136° C. (Resin 2) was used, a 1:2 mixture of dibutyl phthalate and paraffin oil having a kinetic viscosity of 120 cSt at 40° C. was used as diluent. The contents of polyethylene and the diluent were 30 wt % and 70 wt %, respectively.

Phase separation was carried out sufficiently by setting the temperature of the first half of the extruder at 210° C., and the temperature of the latter half at 180° C. and 150° C. A sequential biaxial stretching machine was used and stretching condition, stretching ratio, and heat-setting width ratio and temperature are given in Table 2.

The experimental conditions and results of Examples and Comparative Examples above are summarized in Tables 1 and 2.

TABLE 1

| Manufacturing conditions | | Unit | Examples | | | | |
|---|---|---|---|---|---|---|---|
| | | | 1 | 2 | 3 | 4 | 5 |
| Polyethylene | Mw | g/mol | $3.0 \times 10^5$ | $3.8 \times 10^5$ | $3.8 \times 10^5$ | $3.0 \times 10^5$ | $3.8 \times 10^5$ |
| | Melting temperature | °C. | 135 | 136 | 136 | 135 | 136 |
| | Content | wt % | 25 | 30 | 35 | 40 | 30 |
| Diluent | Content | wt % | 75 | 70 | 65 | 60 | 70 |
| Stretching simultaneous biaxial | PH temperature[1] | °C. | 120 | 118 | 120 | 121 | 118 |
| | ST temperature[1] | °C. | 120 | 118 | 120 | 121 | 118 |
| | HS temperature[1] | °C. | 125 | 120 | 121 | 122 | 122 |
| | Stretching ratio | ratio | 6 × 6 | 7 × 7 | 6 × 6 | 7 × 6 | 8 × 6 |
| Shrinkage upon extacting & drying | | % | 20 | 15 | 30 | 25 | 25 |
| Heat-setting | Temperature | °C. | 126 | 128 | 128 | 128 | 130 |
| | Width ratio[2] | ratio | 1/1.3/1.1 | 1/1.3/1.0 | 1/1.2/1.1 | 1/1.2/1.1 | 1/1.3/1.0 |
| Film thickness | | μm | 14 | 17 | 20 | 16 | 16 |
| Porosity | | % | 42 | 40 | 41 | 45 | 40 |
| Puncture strength (90° C.) | | N/μm | 0.12 | 0.14 | 0.12 | 0.19 | 0.15 |
| Puncture angle (90° C.) | | degree | 33 | 35 | 33 | 34 | 36 |
| Air permeability | | $10^{-5}$ Darcy | 3.9 | 2.9 | 3.4 | 2.8 | 2.8 |
| Permeability after shrinking (120° C., 1 hr) | | $10^{-5}$ Darcy | 2.8 | 2.1 | 2.8 | 2.2 | 2.4 |

[1] PH: preheating zone, ST: stretching zone, HS: heat-setting zone
[2] Width ratio: Inlet width of heat-setting tenter/stretching zone/shrinking zone

TABLE 2

| Manufacturing conditions | | Unit | Comparative Examples | | | | |
|---|---|---|---|---|---|---|---|
| | | | 1 | 2 | 3 | 4 | 5 |
| Polyethylene | Mw | g/mol | $3.0 \times 10^5$ | $3.8 \times 10^5$ | $3.8 \times 10^5$ | $1.8 \times 10^5$ | $3.8 \times 10^5$ |
| | Melting temperature | °C. | 135 | 136 | 136 | 133 | 136 |
| | Content | wt % | 55 | 30 | 40 | 35 | 30 |
| Diluent | Content | wt % | 45 | 70 | 60 | 65 | 70 |
| Stretching simultaneous or sequential biaxial | PH temperature[1] | °C. | 120 | 119 | 118 | 112 | 116 |
| | ST temperature[1] | °C. | 120 | 119 | 118 | 112 | 116 |
| | HS temperature[1] | °C. | 120 | 115 | 110 | 115 | 125 |
| | Stretching ratio | ratio | 6 × 6 | 5 × 4.5 | 6 × 6 | 7 × 4 | 7 × 5 |
| Shrinkage upon extracting & drying | | % | 25 | 10 | 20 | 15 | 35 |
| Heat-setting | Temperature | °C. | 125 | 125 | 130 | 128 | 136 |
| | Width ratio[2] | ratio | 1/1.3/1.2 | 1/1.2/1.0 | 1/1.4/1.3 | 1/1.3/1.0 | 1/1.2/1.0 |
| Film thickness | | μm | 22 | 17 | 21 | 25 | 13 |
| Porosity | | % | 26 | 40 | 35 | 29 | 25 |
| Puncture strength (90° C.) | | N/μm | 0.19 | 0.08 | 0.18 | 0.18 | 0.16 |
| Puncture angle (90° C.) | | degree | 33 | 29 | 33 | 32 | 34 |
| Air permeability | | $10^{-5}$ Darcy | 1.4 | 2.9 | 2.7 | 1.3 | 1.2 |
| Permeability after shrinking (120° C., 1 hr) | | $10^{-5}$ Darcy | 0.9 | 1.7 | 1.5 | 0.8 | 0.9 |

[1] PH: preheating zone, ST: stretching zone, HS: heat-setting zone
[2] Width ratio: Inlet width of heat-setting tenter/stretching zone/shrinking zone As seen above, in Table 1 and Table 2, the microporous polyethylene film prepared in accordance with the present invention exhibited very superior puncture strength and thermal stability at high temperature and showed less decrease of permeability due to low thermal shrinkage at high temperature, as well as superior permeability. Therefore, it can be usefully applied in a high-capacity, high-output battery.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for preparing a microporous polyethylene film comprising:
   (a) melting, compounding and extruding a mixture comprising 20-50 wt % polyethylene and 80-50 wt % diluents, which occurs liquid-liquid phase separation from polyethylene at 160-280° C., above the temperature of liquid-liquid phase separation in an extruder to form a thermodynamic single phase,
   (b) carrying out phase separation of the resultant of molten material in a single phase and forming it into a sheet,
   (c) stretching the sheet by sequential or simultaneous biaxial stretching at a stretching ratio of at least 5.0 times in transverse and machine directions, respectively,
   (d) extracting the diluents from the stretched film, and then shrinking the film by 15-30% while drying, and
   (e) heat-setting the dried film to remove residual stress from the stretched film at a heat-setting tenter temperature at which 30-50% of the film is melted, such that the film that has been stretched to at least 1.2 times is finally shrunken to 1.1 times or less, based on the film width provided to the heat-setting tenter,
   wherein the microporous polyethylene film has a film thickness of 5-40 μm, a porosity of 35-55%, a permeability from $2.5 \times 10^{-5}$ to $10.0 \times 10^{-5}$ Darcy, a puncture strength of at least 0.10 N/μm at 90° C., a puncture angle of at least 30° at 90° C., and a permeability from $2.0 \times 10^{-5}$ to $8.0 \times 10^{-5}$ Darcy after shrinking freely at 120° C. for 1 hour.

2. The method according to claim 1, wherein the microporous polyethylene film has a film thickness of 9-25 a porosity of 35-50%, a permeability from $3.0 \times 10^{-5}$ to $8.0 \times 10^{-5}$ Darcy, a puncture strength of at least 0.12 N/μm at 90° C., a puncture angle of at least 32° at 90° C., and a permeability from $2.5 \times 10^{-5}$ to $7.0 \times 10^{-5}$ Darcy after shrinking freely at 120° C. for 1 hour.

3. The method according to claim 1, wherein the microporous polyethylene film is prepared from a mixture comprising 20-50 wt % polyethylene wherein polyethylene has a weight average molecular weight from $2.0 \times 10^5$ to $4.5 \times 10^5$ and 80-50 wt % diluent.

4. The method according to claim 1, wherein the total stretching ratio is 25 to 50 times.

5. The method according to claim 1, wherein the extraction temperature is not higher than 40° C.

6. The method according to claim 1, wherein the extrusion temperature ranges from 150° C. to 250° C.

7. A microporous polyethylene film prepared according to the method of claim 1.

8. A battery separator comprising the microporous polyethylene film prepared according to the method of claim 1.

9. A battery comprising a battery separator comprising the microporous polyethylene film prepared according to the method of claim 1.

* * * * *

UNITED STATES PATENT AND TRADEMARK OFFICE
CERTIFICATE OF CORRECTION

PATENT NO. : 8,354,185 B2
APPLICATION NO. : 13/403324
DATED : January 15, 2013
INVENTOR(S) : In Hwa Jung et al.

It is certified that error appears in the above-identified patent and that said Letters Patent is hereby corrected as shown below:

Column 15, Line 2, Claim 2, delete "9-25" and insert -- 9-25 µm, --

Signed and Sealed this
Nineteenth Day of March, 2013

Teresa Stanek Rea
*Acting Director of the United States Patent and Trademark Office*